United States Patent [19]

Muchnick

[11] 4,282,793

[45] Aug. 11, 1981

[54] COMPOSITE DRUM HEAD

[75] Inventor: Samuel N. Muchnick, Los Angeles, Calif.

[73] Assignee: Research Development Systems, Inc., S. El Monte, Calif.

[21] Appl. No.: 45,396

[22] Filed: Jun. 4, 1979

Related U.S. Application Data

[63] Continuation-in-part of Ser. No. 910,116, May 30, 1978, abandoned.

[51] Int. Cl.[3] .......................... B32B 3/02; B32B 3/10; G10D 13/02

[52] U.S. Cl. ........................................ 84/414; 84/413; 428/64; 428/66; 428/131; 428/137; 428/192; 428/288; 428/290

[58] Field of Search ................... 428/66, 64, 192, 193, 428/194, 137, 260, 267, 413, 290, 288, 474, 131; 84/411 R, 414 OR, 413

[56] References Cited

U.S. PATENT DOCUMENTS

| | | | |
|---|---|---|---|
| 3,063,966 | 11/1962 | Kwolek | 528/336 |
| 3,068,188 | 12/1962 | Beste et al. | 260/30.2 |
| 3,238,087 | 3/1966 | Norwalk et al. | 428/417 |
| 3,285,117 | 11/1966 | Cheslow | 84/414 |
| 3,425,309 | 2/1969 | Elzas et al. | 84/414 |
| 3,541,056 | 11/1970 | Pikl | 528/314 |
| 3,575,933 | 4/1971 | Hoegger et al. | 528/271 |
| 3,595,951 | 7/1971 | Logalls | 264/211 |
| 3,600,269 | 8/1971 | Daniels et al. | 428/394 X |
| 3,600,350 | 8/1971 | Kwolek | 260/3 |
| 3,668,296 | 6/1972 | Criscuolo | 84/414 |
| 3,671,542 | 6/1972 | Kwolek | 260/30.8 R |
| 3,819,587 | 6/1974 | Kwolek | 528/481 |
| 3,869,430 | 3/1975 | Blades | 528/348 |
| 3,955,465 | 5/1976 | Zickos | 84/411 R |

FOREIGN PATENT DOCUMENTS

| | | | |
|---|---|---|---|
| 1299073 | 12/1972 | United Kingdom | 84/411 R |

*Primary Examiner*—Lorraine T. Kendell
*Attorney, Agent, or Firm*—Wagner & Bachand

[57] ABSTRACT

A composite drum head, comprising polyaramide fiber fabric impregnated with a rigidifying amount of epoxy polymer.

16 Claims, 3 Drawing Figures

FIG.-1
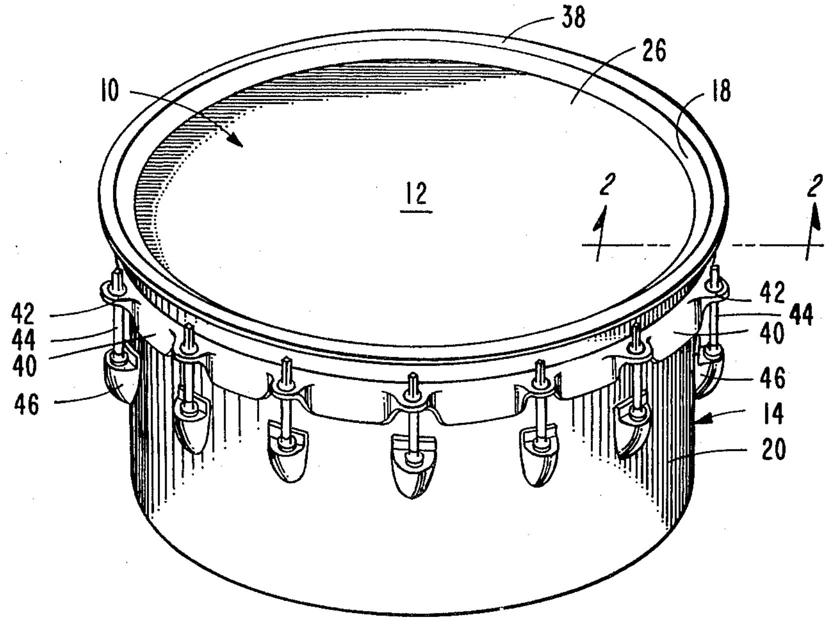
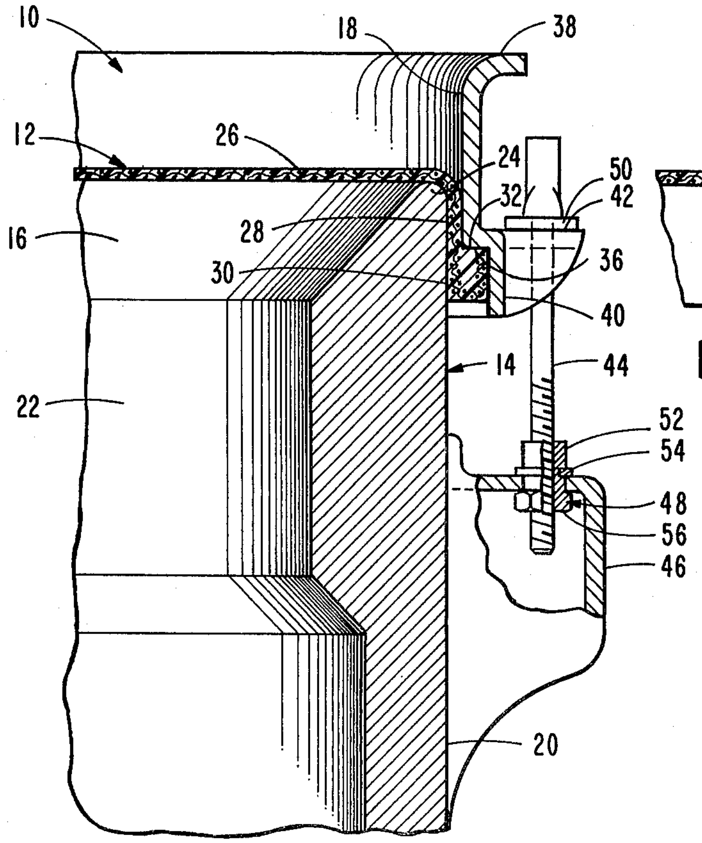
FIG.-2
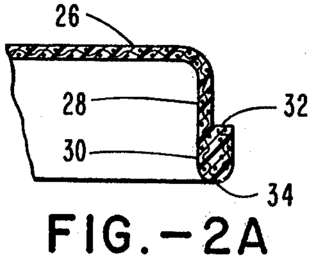
FIG.-2A

COMPOSITE DRUM HEAD

REFERENCE TO A RELATED APPLICATION

This application is a continuation-in-part of my co-pending application Ser. No. 910,116 filed May 30, 1978, now abandoned.

BACKGROUND OF THE INVENTION

This invention has to do with drum heads, the membranes of which are replaceably secured to a drum frame in more or less tensioned condition to define the striking surface. More particularly, the invention relates to a novel, composite drum head, method of making the same and a drum utilizing the novel drum head.

PRIOR ART

For a number of years the preferred membrane for use in musical drums has been a Mylar film (Mylar refers to high molecular weight polyesters of the polyethylene terephthalate type in the form of a thin film) varying in thickness from about 3 mils to 14 mils. In actual experience, Mylar film drum heads have been found to exhibit certain defects which result in problems, or in less than satisfactory performance. One of the most disconcerting defects in Mylar drum heads is that the slightest physical defect in the film often results in an explosive failure, often occurring within a few minutes of use. Thus, it is necessary to carefully avoid such physical defects in the production of drums having Mylar drum heads and to thereafter carefully guard the drum against impact forcing production of such defects. These problems increase the production cost of the head and also are likely to shorten the life of it.

Coupled with the foregoing is the inherent susceptibility of Mylar to denting which contributes to the premature and explosive failure of the drum head. In the same general category is the tendency of Mylar to become embrittled upon repeated or prolonged exposure to ultra-violet light, particularly to normal sunlight. The resulting embrittlement of the drum head leads to crazing or cracking which is soon followed by complete failure.

Another disadvantage of Mylar drum heads is that the material is essentially thermoplastic and tends to undergo cold flow under stress. Moreover, Mylar is capable of functioning as a drum head only when stretched or stressed. Consequently the highly elastic nature of Mylar results in continuing stretching of the drum head while under the normal required tension, necessitating frequent re-tuning.

The foregoing problems have long existed in this art and it is sincerely believed that the hereinafter-described invention represents a substantial advance in the art and significantly dimishes the problems which have plagued drum manufacturers and performers for many years.

Other types of drum heads are known, ranging from the ancient animal skin through molded plastics, e.g. U.S. Pat. No. 3,668,296 issued June 6, 1972 to Criscuolo, and synthetic fibers, e.g. U.S. Pat. No. 3,425,309 issued Feb. 4, 1969 to Elgas et al.

Mylar as a drum head material suffers from a further deficiency in being air impervious whereby tonal vibration is less true than with other types of head materials wherein air permeability, "breathing," or microporosity enables truer vibration response.

SUMMARY OF THE INVENTION

Briefly, the present invention comprehends a novel composite drum head comprising a polymer fiber fabric stiffened by impregnation with an epoxy polymer.

It is an object of the present invention to provide a novel drum head.

More particularly, it is an object of the present invention to provide a composite drum head which significantly reduces, or overcomes, the problems inherent in the drum heads currently in general use.

It is a particular object of this invention to provide a drum head which is resistant to failure regardless of temperature, humidity or stress.

It is another object to provide a drum head having even more than the toughness of the best of synthetic drum heads, and the microporosity of the best natural material drumheads.

It is also a significant object of this invention to provide a drum head which is essentially totally resistant to denting.

In another significant aspect it is an object of this invention to provide a drum head which is non-elastic, thereby being adapted to retain tone control for prolonged or even indefinite periods.

Still another important object of this invention is the provision of a drum head which does not undergo physical or tonal changes with time or varying environmental exposure.

These and other objects to become apparent hereinafter, are realized in accordance with the invention in one particular embodiment, through the provision of a novel membrane adapted to be used as a drum head, the membrane being composed of an interwoven fabric made up of fibers of a polyaramide high molecular weight polymer rigidized with a cured and hardened epoxy resin comprising a cross-linked polymer of a polyglycidyl ether of a polyol; which membrane, in a drum head may be combined with a ring comprising the cured and hardened epoxy resin embedding the peripheral edge of the membrane. The drum head membrane typically includes a generally planar central portion, and a turned down peripheral portion extending from the central portion a relatively short distance essentially perpendicular thereto and terminating at the edge. A novel drum is thus provided comprising a drum frame, and a drum head pulled taut across the drum frame and comprising a membrane composed of an interwoven fabric made up of fibers of a polyaramide high molecular weight polymer rigidized with a cured and hardened epoxy resin comprising a cross-linked polymer of a polyglycidyl ether of a polyol, and a ring comprising the cured and hardened epoxy resin embedding the edge of the membrane.

Generally then, the invention provides a composite drum head having a central portion and a peripheral flange integrally formed of a polyaramide fiber fabric impregnated with epoxy polymer in rigidifying relation. Typically the fabric is woven, but it may be felted or knitted. The epoxy polymer may comprise the mentioned polyglycidyl ether of a polyol and typically is the reaction produce of an epoxide such as epichlorohydrin and a dihydric phenol, particularly a dinuclear dihydric phenol such as 2,2-bis (4-hydroxyphenyl) propane (Bisphenol A), preferably employed in substantially equimolar amounts to produce a normally solid reaction product.

The fabric and epoxy polymer in preferred embodiments cooperate to define interstitial voids forming air passing micropores in the drum head.

As in other embodiments there may be separately formed, in situ, on the drum head a rigid resin ring edge-embedding the head peripheral flange.

Thus in a particularly preferred embodiment, there is provided a composite drum head having a generally planar central portion and a peripheral flange, and comprising a polyaramide fiber fabric, epoxy polymer impregnant, and a rigid resin tensioning anchor ring separately formed on the head in flange edge embedding relation. As in previous embodiments, the fabric herein may be woven, and the epoxy polymer comprise the polyglycidyl ether of a polyol or the reaction product of an epoxide and a dihydric phenol, i.e. a normally solid reaction product of substantially equimolar amounts of epichlorohydrin and a dihydric phenol. The fabric and epoxy polymer preferably cooperate in air passing head micropore defining relation. The fibers, epoxy polymer and ring forming resin are preferably mutually wetting.

More broadly, the invention contemplates a composite drum head having a generally planar central portion and a peripheral flange integrally formed of a synthetic organic fiber fabric impregnated with a rigidifying amount of a fabric fiber wetting polymer, the polymer being solution applicable to the fabric in air passing micropore defining relation upon evaporation of the solution solvent. In this embodiment too, there may be provided a rigid resin tensioning anchor ring separately formed in situ on the drum head in flange edge embedding relation.

There is thus provided a composite drum head membrane comprising synthetic organic fiber fabric and a fabric stiffening polymer combined therewith in interstitial void defining relation.

The invention further contemplates method for making drum heads, which includes impregnating a polyaramide fiber fabric with a rigidifying amount of an epoxy polymer in organic solvent solution, and evaporating the solvent; further, separately forming a head peripheral edge embedding resin ring on the head; and preparing the impregnating solution by dissolving the reaction product of substantially equimolar amounts of epichlorohydrin and a dihydric phenol in a solvent therefor.

BRIEF DESCRIPTION OF THE DRAWINGS

The above and other objects of the present invention may be more fully understood from the following detailed description taken together with the accompanying drawings wherein similar reference characters refer to similar elements throughout, and in which:

FIG. 1 is a fragmentary perspective view of a drum embodying a drum head constructed in accordance with the present invention;

FIG. 2 is a fragmentary vertical sectional view, partially broken away, of the drum of FIG. 1, taken along the line 2—2; and FIG. 2*a* is a fragmentary sectional view of a second embodiment of the drum head of the present invention.

DESCRIPTION OF PREFERRED EMBODIMENTS

Referring now to the drawings, there is illustrated, in FIGS. 1 and 2 thereof, a drum 10 having a drum head 12 embodying the present invention.

The drum 10 may incorporate a drum frame 14 of any conventional design. In the design illustrated, the drum head 12 fits rather closely over an open end 16 of the drum frame and is held in place by a rim 18 which engages the outer edge of the drum head and may be tightened downwardly along the exterior of the drum frame to draw the drum head taut across the open end 16.

The drum frame 14 shown has a generally cylindrical body 20 which terminates in the circular open end 16 and is provided with an inner strengthening rib 22 extending annularly adjacent to the open end 16. The body 20 may be inwardly beveled at the open end 16 to provide a relatively narrow edge 24 thereabout, said edge being radiused to abut the surface of the drum head 12 without damage thereto.

The drum head 12 comprises a resin-impregnated fabric membrane 26 adapted to extend across and close the open end 16. The outer edges of said membrane are turned under to form a short cylindrical portion 28 extending rather closely about the exterior of the body 20 in the area adjacent to the edge 24. The drum head 12 terminates in an annular ring 30 of hardened resinous material in which its outer edge is embedded. The ring 30 may be substantially rectangular in cross-section, with an upper surface 32 adapted to engage the rim 18. The upper surface 32 is preferably located within a plane essentially parallel to that of the membrane 26 and extends radially beyond the membrane.

The ring 30 may be either truly rectangular in cross-section as shown in the embodiment of FIG. 2, or may be radiused somewhat at its lower end 34, as shown in FIG. 2*a*. The radiused structure facilitates installation of the drum head 12 over the open end 16 of the drum frame 14.

The rim 18 is generally circular in shape and is adapted to fit over the drum head 12 while the same is in position on the drum frame 14. The rim 18 is provided with an outward step near its lower end to form a downward facing surface 36 positioned to engage and apply a downward force to the upper surface 32 of the drum ring 30. The rim 18 is provided at its top with a lip 38 and at its bottom with a skirt 40 generally covering the outside of the ring 30.

At regular intervals about the rim 18, the skirt 40 is turned up to form a series of radial flange portions 42 having vertical openings therethrough for the reception of downward directed tightening bolts 44. The exterior of the body 20 is provided with a corresponding series of brackets 46, each of which holds a captive nut 48 having a threaded portion adapted to engage one of the tightening nuts and directed upward from a point directly below the upper surface of one of the flange portions 42. Each of the tightening bolts 44 thus projects down through one of the flange portions 42 to engage one of the captive nuts 48. The bolts 44 are provided with washers 50 to eliminate binding between the bolts and the flange portions 42.

The downward force is applied to the ring 30 as the bolts 44 are tightened relative to the nuts 48, drawing the ring 30 down along the cylindrical body 20. This causes the membrane 26 to be drawn taut across the open end 16. The tension of the membrane 26 may be varied by adjusting the bolts 44.

Each of the captive nuts 48 may comprise a cylindrical threaded sleeve 52 projecting upward through an opening in one of the brackets 46 and retained therein by an external snap ring 54 above the opening and an enlarged lower portion 56 below the opening. The enlarged lower portion 56 also prevents the nut 48 from rotating relative to the bracket.

In operation, the tension of the membrane 26 may be varied by adjusting the bolts 44 relative to the nuts 48 uniformly, as desired. Variations of the tension result in variations of the sound produced when the drum head 12 is struck, allowing drum 10 to be "tuned".

It will be understood that the novel drum head structure of the present invention is not limited to that adapted for use with the drum frame 14 disclosed by way of example herein. Rather, it is broadly applicable to all drums, whether the head shape thereof is circular or non-circular and regardless of the method of retaining the head to the drum body. A second, lower membrane may also be affixed to a lower opening in some drums to provide a desired sound.

The fabric of the membrane 26 is a polyaramide produced by DuPont under the name Kevlar. In the manufacture of the drum head 12 the fabric is first cut to the required size and shape (generally circular), wetted down with the epoxy polymer solution, and placed into a mold having the contour of the finished head as shown in the drawings. It is then dried by exposure to mild heat. This operation results in a hat shape which is then cut to the required height. It is then placed into a circular channel of U-shaped cross-section which has already been filed with epoxy polymer which is dried, hardened or cured to form the annular ring 30 described above. It is then ejected by six pins which are positioned in the channel. It is now ready for finishing, rounding of sharp edges, and removal of any flash.

Alternatively, the generally circular piece of Kevlar polyaramide fiber fabric is wetted with the epoxy polymer solution only around its periphery extending inwardly for about ½ inch to about 2 inches from the edge. The wetted edges are then placed in the circular channel which has already been filled with epoxy polymer. This assembly is then placed in a heated hat-shaped mold to solidify the epoxy resin. The cured product after ejection from the mold has a rigid peripheral ring or bead 30 of epoxy polymer containing the edge of the Kevlar fabric. The Kevlar fabric immediately adjacent the rim or bead is rigidified by the epoxy polymer and has the final curved edge configuration of the drum head. In a subsequent operation the center portion of the rim may be impregnated with epoxy polymer and subsequently heat dried, hardened or cured to complete the drum head.

The fabric employed in the manufacture of the drum head of this invention is composed of a filament from polymers referred to generally as polyaramides meaning that they are essentially wholly aromatic polyamides and are characterized by the following recurring structure:

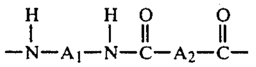

wherein $A_1$ and $A_2$ may be the same or different, and may be an unsubstituted divalent aromatic radical or a substituted divalent aromatic radical, chain-extending bonds of these divalent aromatic radicals being oriented meta or para to one another and the substituents attached to any aromatic nucleus being one or more of a mixture of lower alkyl, lower alkoxy, halogen, sulfonyl, nitro, lower carbalkoxy or other groups which do not condense with the reactants during polymerization. These aromatic polyamides generally have a melting point of at least about 300° C. and an inherent viscosity in concentrated sulfonic acid of at least about 0.6. More particularly, the aromatic polyamides in fiber form used to make up the fabric of this invention refers to a polymer wherein repeating units are linked by a carbonamide group, i.e., the

radical, the nitrogen and carbonyl of each repeating carbonamide radical being directly attached to a carbon atom in the ring of an aromatic radical; that is, the nitrogen and carbonyl of each repeating carbonamide group each replaces a hydrogen of an aromatic. The term "aromatic ring" means a carbocyclic ring possessing resonance. Exemplary aromatic radicals have the following structural formulas

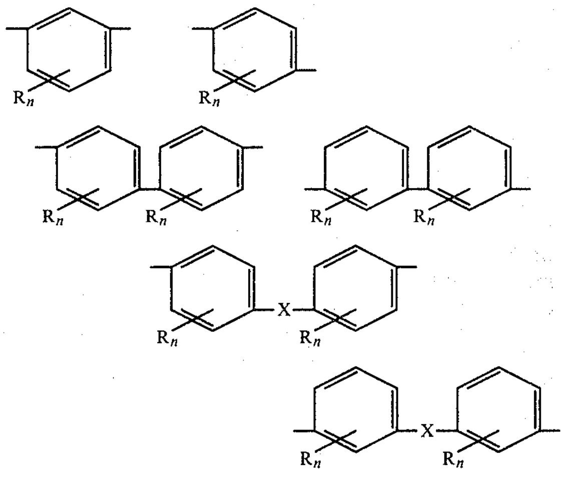

in which R is preferably a lower alkyl, lower alkoxy, or halogen group, n is a number from 0–4, inclusive, and X is preferably one of the groups of

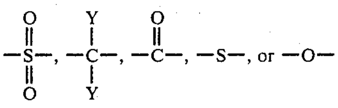

in which Y is a hydrogen or a lower alkyl group. X may also be a lower alkylene or lower alkylene dioxy group although these are somewhat less desirable. R may also be a nitro, lower carbalkoxy, or other non-reactive group. All of these aromatic radicals are divalent and meta or para oriented; i.e., the unsatisfied bonds of the radicals (the "chain-extending bonds") when the radical is viewed in the repeating unit of the structural formula of the polymer) are meta or para oriented with respect to each other. One or more of the aromatic radicals may contain substituent groups as indicated, and any aromatic ring may contain two or more of the same or different substituent groups. Preferable, however, are high molecular weight polymers in which the aromatic radicals are unsubstituted or contain only lower alkyl groups attached to any one ring. The term "non-reactive groups" refers to groups which do not react with aromatic amino or aromatic carboxylic halide during the polymerization reaction herein disclosed. The term "chain-extending bond" refers to any bond in the polyamide which, if broken, would decrease the length of the polymer chain.

High molecular weight aramide polymers are prepared by reacting an aromatic diacid halide with an aromatic diamine, the acid groups of the diacid halide and the amine groups of the diamine being meta or para oriented relative to each other, at low temperatures (below 100° C.)

The epoxy polymers utilized in the product of the novel drum head of this invention may be glycidyl ethers of dihydric phenols prepared by heating e.g. at 50° C. to 150° C. the dihydric phenols with an epoxide such as epichlorhydrin, using preferably one, or two or more mols of epichlorhydrin per mol of the dihydric phenol, typically in the presence of a base such as sodium, potassium, calcium or bariun hydroxide in an amount of 10% to 30% stoichiometric excess of the epichlorhydrin—i.e., 1.1 to 1.3 equivalents of base per mol of epichlorhydrin. The heating is continued for several hours to convert the reactant to a taffy-like consistency whereupon the reaction product is washed with water until free of base. The principal product may be represented by the formula

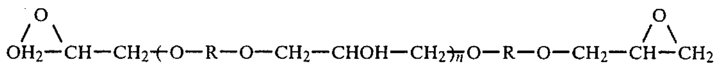

wherein R represents the divalent hydrocarbon radical of the dihydric phenol and n is 0, 1, 2, 3 . . . 30 . . . 80 or more. The length of the chain can be made to vary by changing the molecular proportion of epichlorhydrin per mol of dihydric alcohol from about two downwards toward one, the molecular weight and the softening point of the resinous glycidyl ether is increased until a thermoplastic polymer having the repeating unit $-[D-O-E]_z-$ is obtained, wherein D is the radical residium of a dihydric phenol, E the radical residium of an epoxide and z an interger which represents the degree of polymerization and is at least 30 and preferably above about 80.

The glycidyl ethers from bis-phenol having as the principal component thereof a substance which may be represented by the formula

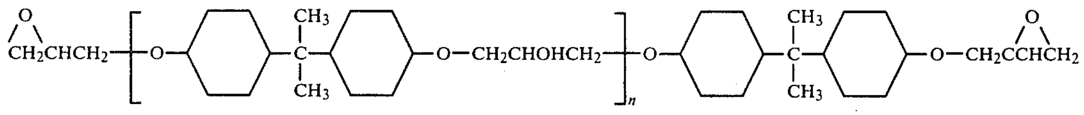

wherein n is 0, 1, 2, 3, etc. and an epoxy equivalency greater than one cure to hard, tough, insoluble resins with various curing agents and are the preferred epoxy polymers for use in forming the tensioning ring as described above.

For the impregnant epoxy polymer, however, it is preferred to employ the thermoplastic epoxy polymer noted above. A commercial product available from Union Carbide as "phenoxy" may be effectively used. These epoxy polymers their preparation and various uses thereof are described in U.S. Pat. No. 3,238,087 to Norwalk et al, the disclosure of which patent is herewith incorporated herein by reference.

EXAMPLE

The Kevlar fabric described above, and cut approximately to size, is impregnated with a 20% by weight tetrahydrofuran solution of epoxy polymer (phenoxy, ex: Union Carbide), by immersing the fabric in the solution. The wetted fabric is heated briefly in a molding press to drive off the solvent for a time and at a rate ensuring interstitial voids in the impregnated fabric, and simultaneously shape the fabric to the hat shape mentioned. The downturned flange is selectively immersed in a thermosetting epoxy polymer to form a edge embedding ring useful for tensioning the head on a drum as explained above.

I claim:

1. A novel drum head membrane structure having a generally planar central portion and a turned down peripheral portion extending from said central portion a relatively short distance and essentially perpendicular thereto, said structure comprising an interwoven fabric made up of fibers of a polyaramide high molecular weight polymer rigidized with a cured and hardened epoxy resin comprising a cross-linked polymer of a polyglycidyl ether of a polyol, said fabric and epoxy cooperating to define interstitial voids forming air passing micropores in the drum head membrane structure.

2. A novel drum head comprising:

a membrane composed of an interwoven fabric made up of fibers of a polyaramide high molecular weight polymer rigidized with a cured and hardened epoxy resin comprising a cross-linked polymer of a polyglycidyl ether of a polyol, said fabric and said epoxy cooperating to define interstitial voids forming air-passing micropores in the drum head membrane structure; and a ring comprising said cured and hardened epoxy resin embedding the peripheral edge of said membrane.

3. The drum head of claim 2 wherein said membrane includes:

a generally planar central portion; and a turned-down peripheral portion extending from said central portion a relatively short distance essentially perpendicular thereto and terminating at said edge.

4. A novel drum comprising:

a drum frame; and a drum head pulled taut across said drum frame and comprising a membrane composed of an interwoven fabric made up of fibers of a polyaramide high molecular weight polymer rigidized with a cured and hardened epoxy resin comprising a cross-linked polymer of a polyglycidyl ether of a polyol, and a ring comprising said cured and hardened epoxy resin embedding the edge of said membrane; said fabric and said epoxy cooperating to define interstitial voids forming air passing micropores in said membrane.

5. A composite drum head having a generally planar central portion and a peripheral flange integrally formed of a polyaramide fiber fabric rigidified with impregnated epoxy polymer, said fabric and polymer cooperating to form air-passing micropores in said drum head.

6. Compositc drum head according to claim 5 in which said fabric is woven.

7. Composite drum head according to claim 5 in which said epoxy polymer comprises the polyglycidyl ether of a polyol.

8. Composite drum head according to claim 5 in which said epoxy polymer comprises the reaction product of an epoxide and a dihydic phenol.

9. Composite drum head according to claim 8 in which said epoxy polymer is a normally solid, reaction product of substantially equimolar amounts of epichlorhydrin and a dihydic phenol.

10. A composite drum head having a generally planar central portion and a peripheral flange, and comprising a polyaramide fiber fabric, an epoxy polymer impregnant which cooperates with the fabric to form air passing micropores in the drum head, and a rigid resin tensioning anchor ring separately formed on said head to embed the flange edge.

11. Composite drum head according to claim 10 in which said fabric is woven.

12. Composite drum head according to claim 10 in which said epoxy polymer comprises the polyglycidyl ether of a polyol.

13. Composite drum head according to claim 10 in which said epoxy polymer comprises the reaction product of an epoxide and a dihydric phenol.

14. Composite drum head according to claim 13 in which said epoxy polymer is a normally solid reaction product of substantially equimolar amounts of epichlorohydrin and a dihydric phenol.

15. Composite drum head according to claim 14 in which said fibers, said epoxy polymer and said ring resin are mutually wetting.

16. Composite drum head membrane comprising synthetic organic fiber fabric and a fabric stiffening polymer defining therewith interstitial voids forming air passing micropores in the drum head membrane.

* * * * *